US009574735B2

(12) United States Patent
Benitez et al.

(10) Patent No.: US 9,574,735 B2
(45) Date of Patent: Feb. 21, 2017

(54) SHELL INTEGRATOR

(75) Inventors: Pablo Benitez, Madrid (ES); Oliver Dross, Cologne (DE); Maikel Hernandez, Madrid (ES); Juan Carlos Minano, Madrid (ES)

(73) Assignee: Light Prescriptions Innovators, LLC, Altadena, CA (US)

(*) Notice: Subject to any disclaimer, the term of this patent is extended or adjusted under 35 U.S.C. 154(b) by 387 days.

(21) Appl. No.: 13/821,823

(22) PCT Filed: Sep. 22, 2011

(86) PCT No.: PCT/US2011/052679
§ 371 (c)(1),
(2), (4) Date: Apr. 10, 2013

(87) PCT Pub. No.: WO2012/040414
PCT Pub. Date: Mar. 29, 2012

(65) Prior Publication Data
US 2013/0194811 A1      Aug. 1, 2013

Related U.S. Application Data

(60) Provisional application No. 61/385,675, filed on Sep. 23, 2010.

(51) Int. Cl.
*F21V 3/00*      (2015.01)
*F21V 5/04*      (2006.01)
(Continued)

(52) U.S. Cl.
CPC .............. *F21V 5/04* (2013.01); *G02B 3/0037* (2013.01); *G02B 27/0961* (2013.01);
(Continued)

(58) Field of Classification Search
CPC ......... G02B 1/045; G02B 5/18; G02B 5/1847; G02B 27/0961; G02B 3/0037; G02B 5/02; G02B 3/00; G02B 3/14; F21V 3/00; F21V 5/004; F21V 5/007; F21V 5/008; F21V 5/04; F21Y 2113/002; F21Y 2101/02; F21Y 2113/007
(Continued)

(56) References Cited

U.S. PATENT DOCUMENTS 3,131,595 A * 5/1964 Kalustyan ................ G02B 1/00
                                                                          353/102
5,420,720 A * 5/1995 Gal ....................... G02B 3/0056
                                                                          359/619
(Continued)

FOREIGN PATENT DOCUMENTS

KR      1020090037901 A      4/2009
WO         2008016908 A2     2/2008

*Primary Examiner* — Jason Moon Han
*Assistant Examiner* — Omar Rojas Cadima
(74) *Attorney, Agent, or Firm* — Drinker Biddle & Reath LLP

(57) ABSTRACT

A luminaire has a light source and a shell integrator. The shell integrator has a transparent dome over the light source, with inner and outer surfaces formed as arrays of lenslets. Each lenslet of the inner surface images the light source onto a respective lenslet of the outer surface, and each lenslet of the outer surface images the respective lenslet of the inner surface as a virtual image onto the light source. The dome may be substantially hemispherical. The light source and the integrator may be at an input of a collimator.

19 Claims, 12 Drawing Sheets

(51) Int. Cl.
*G02B 3/00* (2006.01)
*G02B 27/09* (2006.01)
G02B 5/02 (2006.01)
F21Y 101/00 (2016.01)

(52) U.S. Cl.
CPC ....... *F21Y 2101/00* (2013.01); *F21Y 2113/17* (2016.08); *F21Y 2115/10* (2016.08); *G02B 5/02* (2013.01)

(58) Field of Classification Search
USPC .......... 362/311.01, 606, 610, 296.09, 296.1, 362/311.1, 326, 363; 359/838, 601–614, 359/599, 409, 741, 35, 619–628
See application file for complete search history.

(56) References Cited

U.S. PATENT DOCUMENTS

| | | |
|---|---|---|
| 5,731,899 A | 3/1998 | Meyers |
| 2005/0190564 A1* | 9/2005 | Amano ................. F21S 48/215 362/336 |
| 2005/0254018 A1 | 11/2005 | Magarill |
| 2007/0152231 A1* | 7/2007 | Destain .................. H01L 33/58 257/99 |
| 2008/0030986 A1 | 2/2008 | Ogawa |
| 2008/0316761 A1 | 12/2008 | Minano |
| 2009/0121238 A1* | 5/2009 | Peck .............................. 257/89 |
| 2010/0290234 A1* | 11/2010 | Bierhuizen et al. ..... 362/311.02 |

* cited by examiner

PRIOR ART

501

601

SHELL INTEGRATOR

CROSS REFERENCE TO RELATED APPLICATION

This application claims benefit of U.S. Provisional Patent Application No. 61/385,675 for a "Shell Integrator", filed on 23 Sep. 2010 by Benítez and Dross, which is incorporated herein by reference in its entirety.

BACKGROUND OF THE INVENTION

Most LED chip manufacturers do not offer chips larger than 1×1 mm. The light flux that can be produced by each such chip is ever increasing, but still for many applications a single LED chip does not produce enough light, and therefore LED sources with a multitude of chips are produced. In other cases chips of different colors (including different phosphor-converted chips to add shades of white, yellow or green) are combined to allow the production of color-switchable LED light sources or high color rendering white LED light sources.

These LED light sources consist of multiple chips arranged on a planar substrate with or without significant spacing between them. Typical layouts are 2×2 or 3×3 chips arranged in a close-packed square or rectangle, or any higher number of chips, e.g., in the range of 25. Even much higher numbers of chips, often smaller than 1×1 mm, are used for certain LED products.

In all cases the full array of chips is covered with a dielectric material for protection and to enhance light extraction. In some cases phosphors for white light creation are added. Bulk diffusion is sometimes employed too, aiding color mixing. These LEDs can have a total flux of several thousand Lumens.

Two problems arise with these light sources. The first problem is that, when looking back into the source, the user perceives the individual chips as separated bright spots. This may be acceptable if all chips have the same color, but in applications where chips of different colors are mixed (red, green and blue, for example) this is often unacceptable. The second problem arises when secondary optics are added to these multichip LED sources: many optics, especially those that create high collimation, reproduce the structure of the light source in the far field intensity pattern or in the illuminance pattern on a target surface, depending on what they are designed for. That leads to visible brightness variations, or even worse, to color shifts in the pattern that, in the worst case of an RGB LED, can reproduce clearly the different color chips employed.

Diffusers or tessellations on refractive or reflective surfaces are often employed to mitigate these problems although at the expense of some efficiency loss. Furthermore, the diffusion angle that needs to be added to the optical system to erase color or brightness artifacts typically has to be several times larger than the angular range of the collimation that is produced by the secondary optics so that the collimating effect of the secondary optics is partially eroded.

One possible solution to this problem is to employ Köhler integrating optics, and more precisely so-called "fly's eye array" arrays of pairs of microlenses, to erase color and brightness artifacts from a light pattern. Some disadvantages of the "fly's eye array" are that: the microlens arrays must typically be very large to cover the entire exit aperture of the collimation optics; they only work for highly collimated light; they are costly to manufacture; and the light pattern produced is usually a flat-top radiation pattern that is very different from typical smooth radiation patterns wanted in general illumination. Additionally, fly's eye arrays can themselves introduce square or rectangular artifacts, depending on the outline of the individual microlenses they are made of.

SUMMARY OF THE INVENTION

Instead of adding an integrator to the exit aperture of the collimator, it is possible to add a shell integrator lens over the LED to do the integration before the secondary optics. Where the original emission from the LED package is basically Lambertian, the light emission after the integrating shell lens could (but does not have to) still be basically Lambertian. However, in an embodiment the shell integrator alters the light from the LED package in a way that makes the combined LED package and integrator behave like a slightly larger source but of completely uniform color, independently from the arrangement of LED chips within the package. The embodiment of the shell integrator lens thus creates a virtual source of uniform color and brightness. Subsequent secondary optics can now pick up the light from the shell integrator and collimate it without creating any color or intensity artifacts from the original source in the far field or target plane. Another advantage is that standard collimators that can create a wide variety of intensity patterns can be employed with the same source and shell integrator lens.

At the same time, when looking back into the source, the observer does not perceive the original source, but a fragmented virtual source. If the shell integrator uses lenslets, and those lenslets are small enough, the virtual source can appear uniform to the human eye.

An embodiment of the shell integrator lens works similarly to standard planar fly's eye integrating arrays. That embodiment consists of a basically hemispherical dielectric shell that has microlenses on both the inner and other surface. It is placed over the LED source so that the inner cavity of the shell integrator lens is made larger than the diameter of the LED encapsulant.

BRIEF DESCRIPTION OF THE DRAWINGS

The above and other aspects, features and advantages of the present invention will be apparent from the following more particular description, presented in conjunction with the following drawings, wherein.

DETAILED DESCRIPTION OF THE PREFERRED EMBODIMENTS

A better understanding of various features and advantages of the present invention will be obtained by reference to the following detailed description of illustrative embodiments of the invention and accompanying drawings, in which various principles of the invention are utilized.

Figure 1:
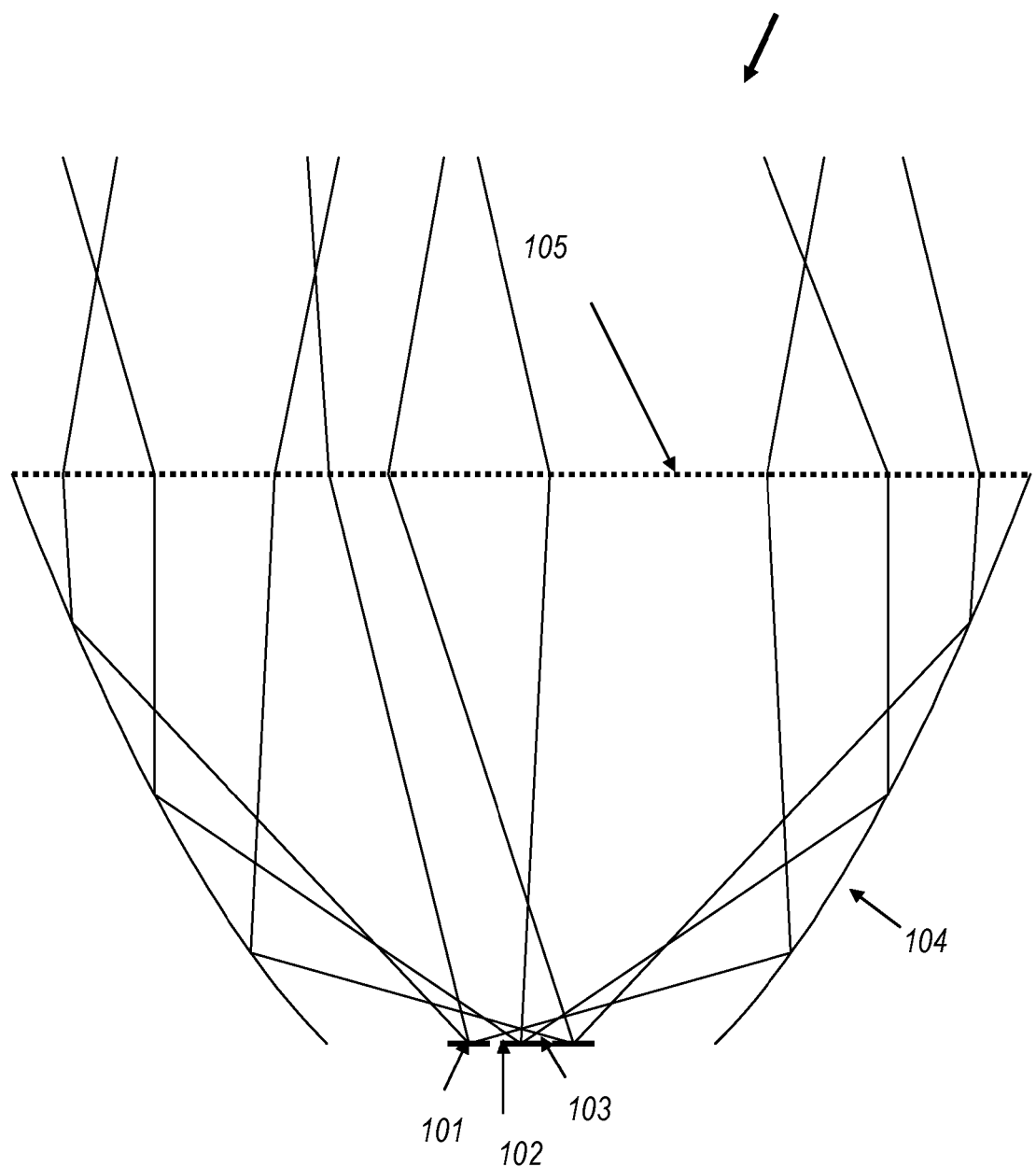
FIG. 1 shows a prior art parabolic reflector with a diffuser to provide color mixing.

FIG. 1 shows an RGB LED light source with three LEDs, one red 101, one green 102, and one blue 103. Mirror 104 is a parabola that collimates the light, imaging the source onto the far-field. This, however, will create three different spots on the far field: one red, one green and one blue, as is shown by exemplary light rays in FIG. 1 as they leave the reflector. To generate white light, these three colors must be mixed and a way to accomplish that is by adding a diffuser 105 that will spread the light from all the three LEDs, as is shown by the irregular deflections of the exemplary rays in FIG. 1 at the diffuser. However, diffusion increases the output angle and, therefore, decreases the ability of the optic to deliver collimated light. The diffuser significantly increases the étendue of the outgoing light.

Figure 2:
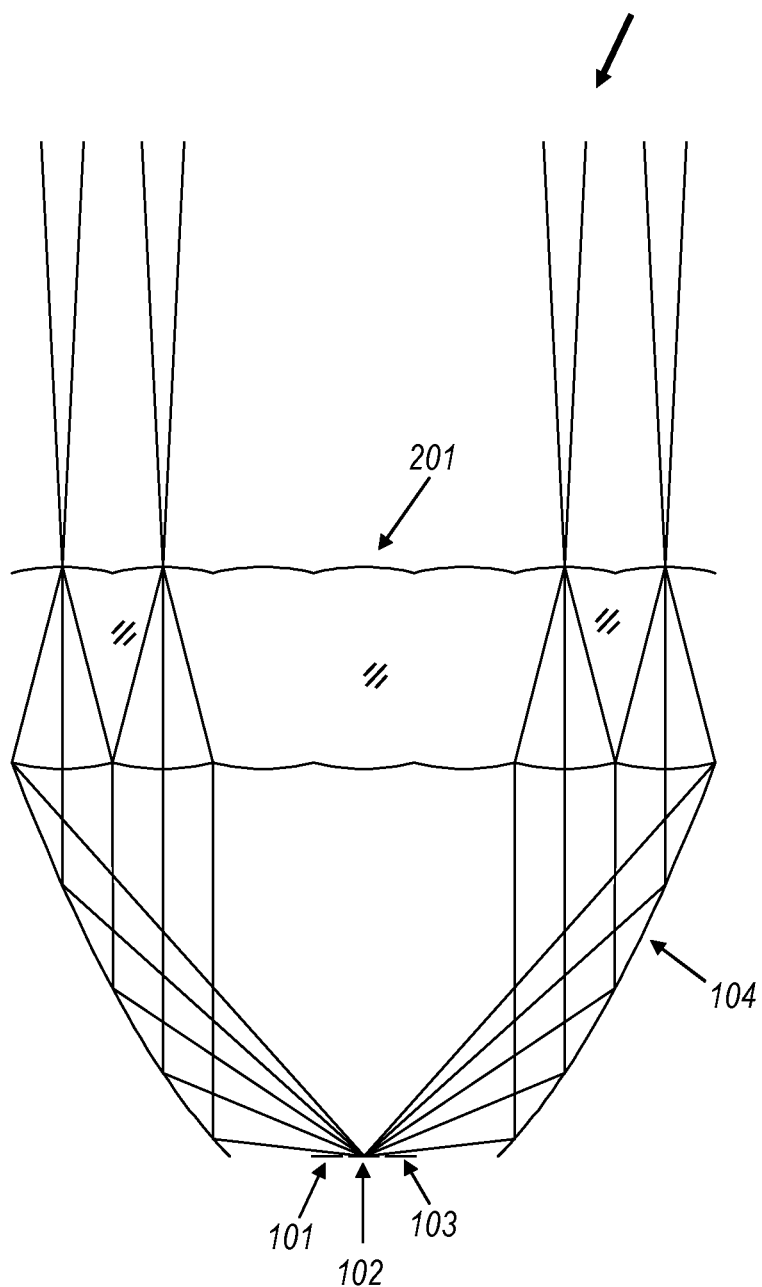
FIG. 2 shows a prior art parabolic reflector with fly's eye lens to provide color mixing.

FIG. 2 shows a similar situation to that in FIG. 1 but now instead of a diffuser we have a Köhler integrator 201 at the exit aperture of the parabolic collimator 104. Now the angular "diffusion" of the light coming from each LED is done in a controlled way and ideally the étendue of the source would be maintained after crossing the integrator optic.

Figure 3A:
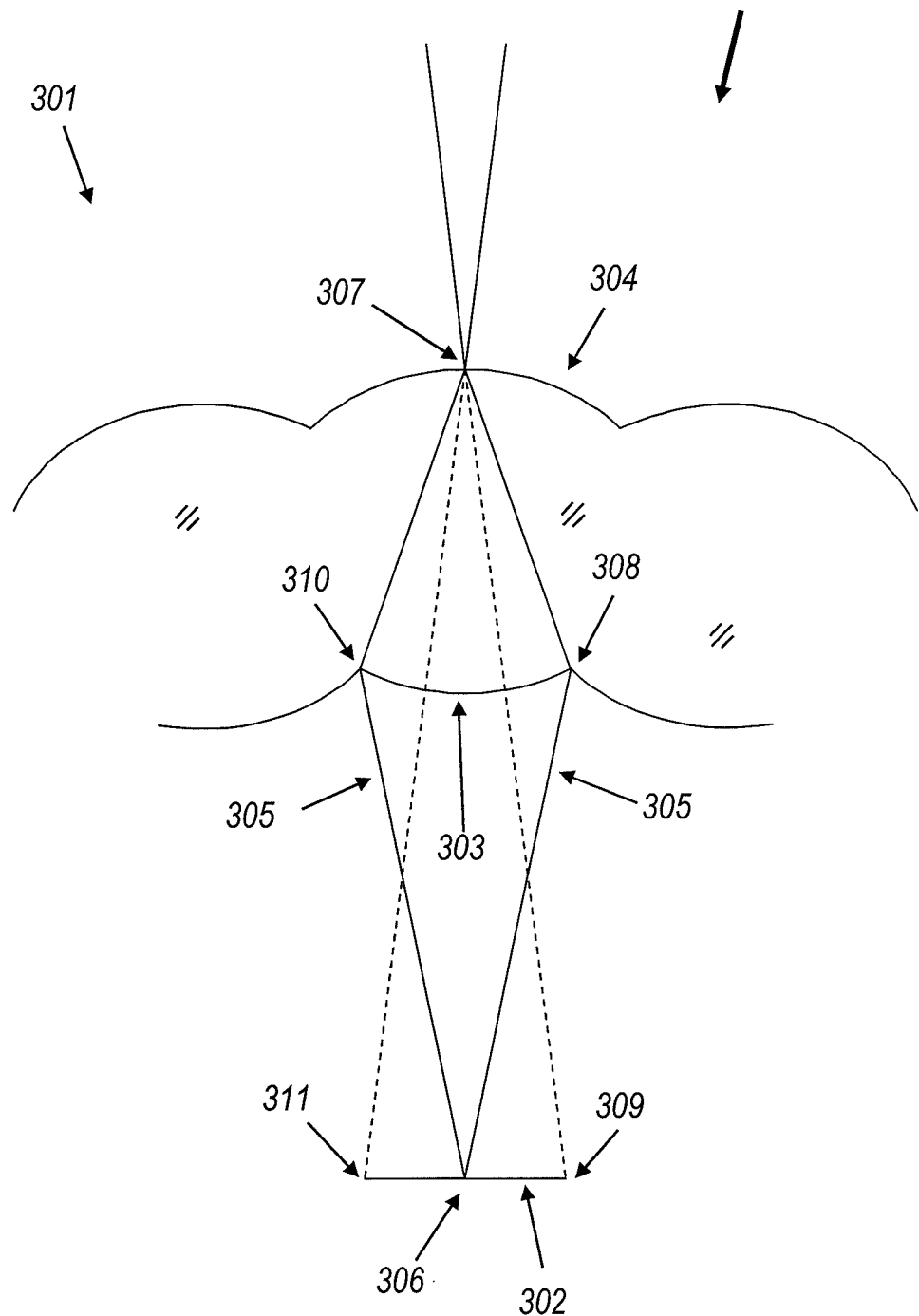
FIGS. 3A and 3B show certain working principles of a shell integrator.
Figure 3B:
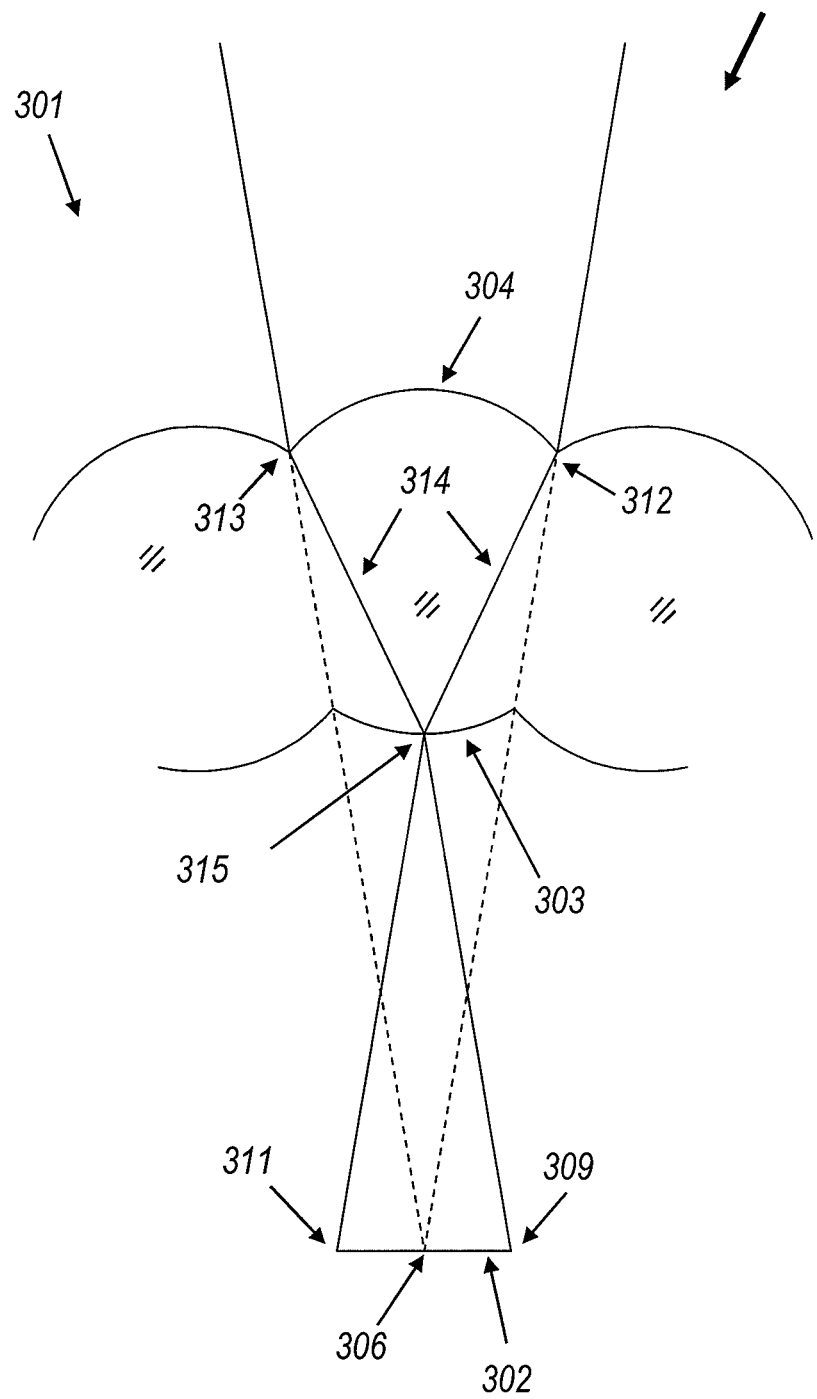

FIG. 3A and FIG. 3B show working principles of the present integrators. Integrator lens 301 has several inner microlenses 303 and corresponding outer microlenses 304. Inner microlens 303 images the source 302 onto outer microlens 304 and outer microlens 304 creates a virtual image of microlens 303 superimposed on source 302.

Since inner microlens 303 images the source 302 onto outer microlens 304, rays 305 coming from the center point 306 of source 302 are focused onto point 307 at the center of outer microlens 304. On the other hand, since microlens 304 creates a virtual image of microlens 303 superimposed on source 302, a ray coming from right edge 308 of inner microlens 303 and hitting outer microlens 304 will exit microlens 304 as if coming from the right edge 309 of source 302. For the same reason, a ray coming from the left edge 310 of inner microlens 303 and hitting outer microlens 304 will exit 304 as if coming from the left edge 311 of source 302.

Since inner microlens 303 images the source 302 onto outer microlens 304, a ray coming from the left edge 311 of the source will be imaged onto the right edge 312 of microlens 304. For the same reason, a ray coming from the right edge 309 of the source will be imaged onto the left edge 313 of microlens 304. On the other hand, since microlens 304 creates a virtual image of microlens 303 superimposed on source 302, rays 314 coming from the center 315 of microlens 303 will exit microlens 304 as if coming from the center 306 of source 302.

Figure 4:
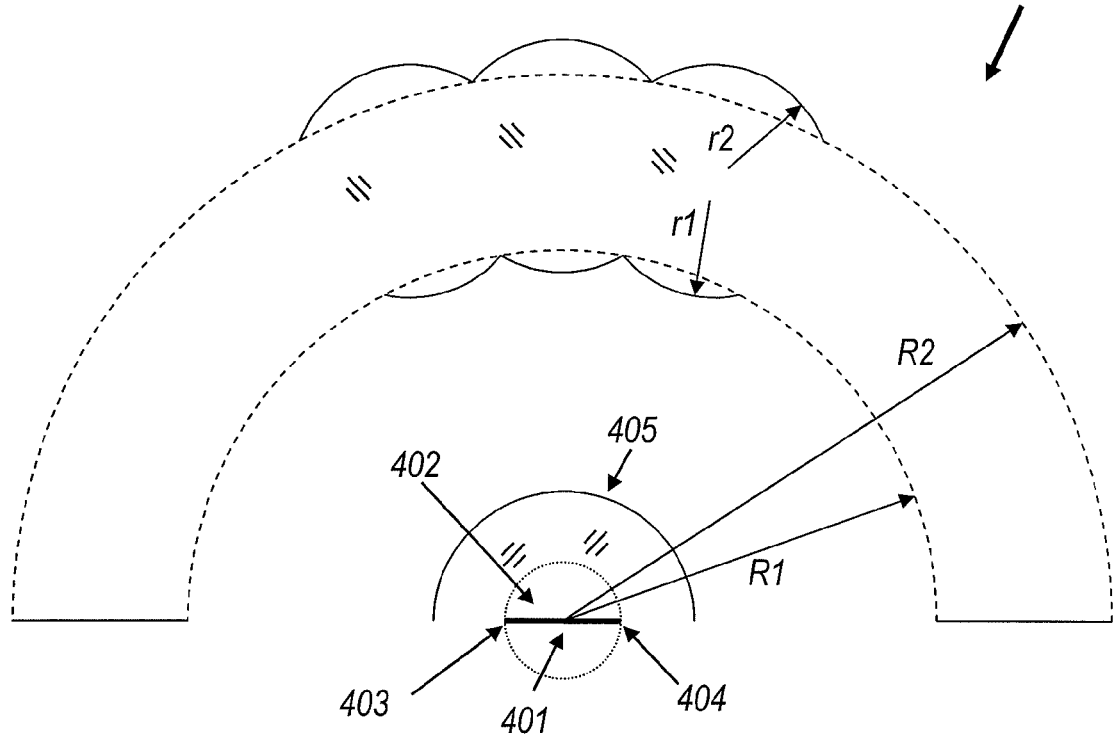
FIG. 4 shows the integration zone and the lenslet placement of a shell integrator.

FIG. 4 shows a set of inner microlenses on a surface of radius R1 and a set of outer microlenses on a surface of a larger radius R2.

The number of microlenses on the inner and outer surface of the shell integrator is the same and the lenslets are calculated in pairs. A first microlens on the inner surface of the shell integrator is designed to focus the center point 401 of the light source 402 onto the outer surface of the shell integrator. The contour of the microlens can be spherical, elliptical or aspheric. For simplicity, the paraxial approximation is used for the calculations, so that spherical lenslet profiles are assumed. We define r1 and r2 as the radii of curvature of the inner and outer microlens of a corresponding lenslet pair. In a first embodiment the shell integrator is spherical: R1 and R2 are the radii of the shell integrator inner and outer surface. The integration zone is a space that includes the entire apparent source size. That is to say, the integration zone is the space occupied and defined by all the virtual images formed by the microlenses (such as 304 in FIGS. 3A and 3B) in the outer surface. For simplicity this integration zone is assumed in the present calculation to be spherical, and is shown by a dotted circle in FIG. 4. The apparent radius of the integration zone is defined by the outermost emission points 403 and 404 of the real source size magnified by the index of refraction of an encapsulant 405 covering the real source 402. However, if the virtual images coincide with a planar array of LED chips, as described above with reference to FIGS. 3A and 3B, that would qualify as a planar (and typically approximately circular) integration zone.

The conditions to be met are that the inner lenslet curvature radius r1 is chosen to focus rays from the center of the integrating zone 401 onto the outer shell surface and that the edge of the integration zone is imaged by the inner microlens to the edge of the outer microlens. The outer lenslet curvature radius r2 is chosen so that the rays coming from the center point of the inner lenslet are refracted to form a virtual light source at the center 401 of the real source.

From these two conditions the following formulae can be easily derived:

$$1/r1=1/(n-1)*(1/R1+n/(R2-R1))$$

$$1/r2=1/(n-1)*(-1/R2+n/(R2-R1))$$

where n is the index of refraction of the dielectric material used for the design.

The integrating zone width H follows from $$H=n*eps*R1R2/(R2-R1)$$

where eps is the opening angle of the facet seen from the origin.

The opening angle eps follows from the number of facets chosen to be arranged on the sphere. With eps fixed one can vary R1 and R2 of the shell integrator to adjust the integrating zone to the source used.

The general condition for Köhler integration is that the second lenslet will create well mixed light output, if the irradiance over the aperture of the first lenslet is constant for each color. This condition makes a small angle eps advantageous in many circumstances.

A small shell integrator is advantageous from the packing standpoint of the luminaire and for manufacturing cost reasons, however several limitations arise. The manufacturing of the microlenses becomes more complex for very small microlenses, so that the angle eps should not be chosen too small. For very thin shells (R1 and R2 separated by a small distance) the f/# of the lenslets becomes very small, so that their imaging qualities degrade. It is presently preferred that the inner diameter of the shell integrator should be at least about twice as large as the integration zone diameter to give solutions for the inner and outer shell lenslets that are realistic for commercial manufacture.

If the integration zone is chosen to be spherical, all facets will have identical parameters. The pairs of facets need to be arranged on the inner and outer sphere of the shell integrator. Tessellating a sphere naturally results in the lenslets being polygonal. For good results, the tessellation is chosen to ensure that the size of the polygons is approximately the same all over the hemisphere, so that the integration zone size is kept constant all over the design. Furthermore, a tessellation is chosen that ensures that all polygons are as "round" as practical, because the integration zone of each facet pair has the same geometric shape as the outline of the facets. The tessellation of the inside and outside sphere is identical.

Figure 5A:
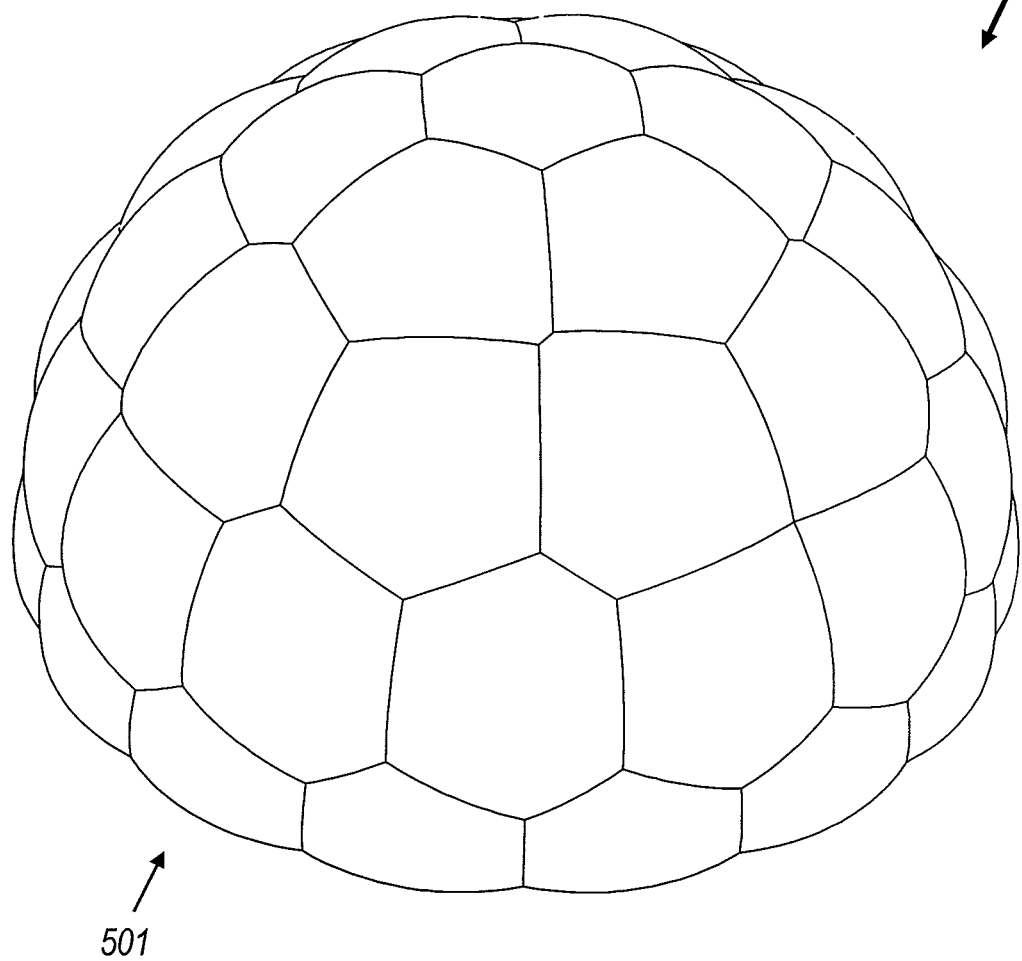
FIG. 5A shows the outer surface of a first preferred embodiment of a shell integrator with a low count of irregular microlenses.
Figure 5B:
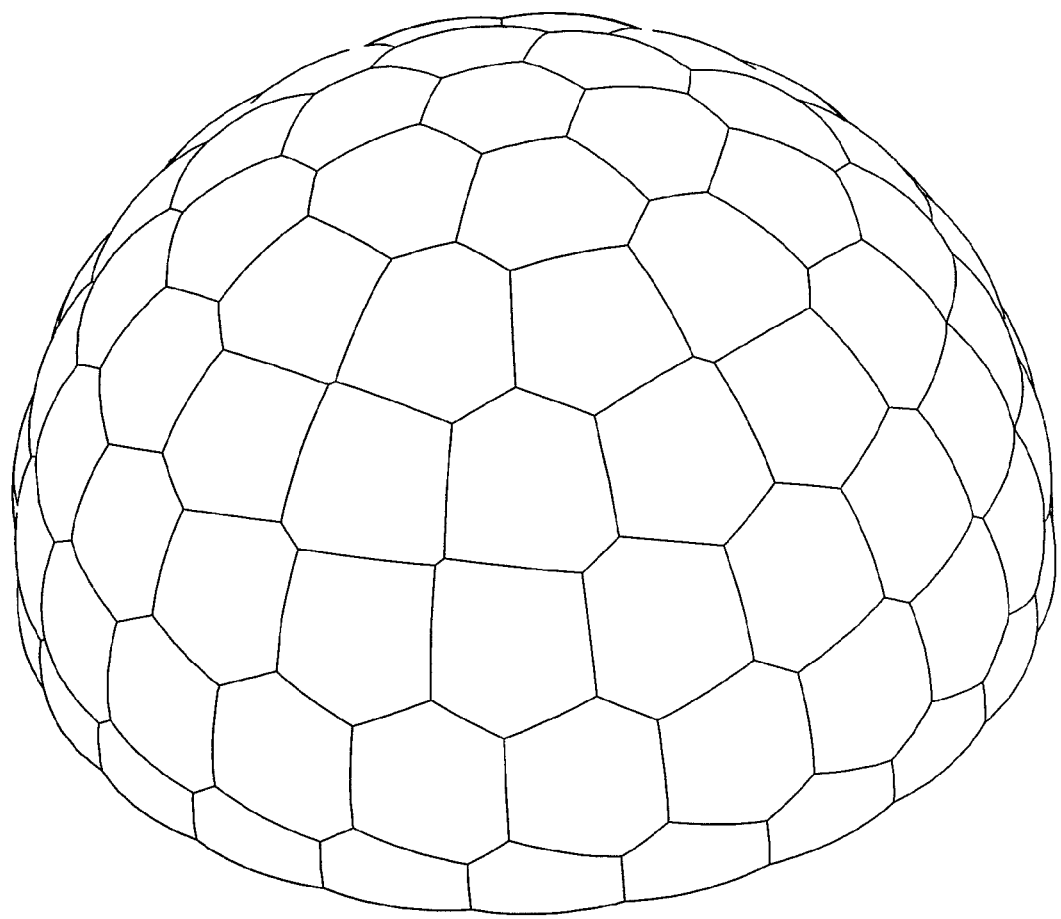
FIG. 5B shows the outer surface of a second preferred embodiment of a shell integrator with a higher count of irregular microlenses.

FIG. 5A and FIG. 5B show a tessellation 501 of order 5 and tessellation 502 of order 7 with a total of 54 and 110 facets per shell respectively. That is to say, there are respectively 5 and 7 tiers or rings of facets from the pole to the rim of the hemisphere, with a single facet at the pole counted as the first tier.

The centers of the facets are calculated to lie on circles of equal off axis (altitude) angle theta on the hemisphere surface and with the condition of finding a number of facets per circle that provides a facet width (in the azimuth angle direction) similar to the height (in the altitude angle direction) that follows from the chosen number of rings.

If theta_k is the off axis angle from the z axis of the k'th ring of microlenses, the number of microlenses per ring can be easily derived as: Round(4 m sin(theta_k)), where m is the number of rings chosen. For a tessellation of the order m=5, there is one center facet on the z axis counted as the first ring, 6 facets on the second ring, and 12, 16, and 19 facets on the subsequent rings.

For an m=7 tessellation, the facets numbers per ring would be 1, 6, 12, 17, 22, 25, 27. Because the number of facets in each ring is rounded to a whole number, some of the numbers may differ by 1 from those given here. The facet perimeters can be found easily in a CAD program constructing all spherical facet surfaces on the given positions of a hemisphere and intersecting them with each other. The resulting facets are mostly irregular, in the sense of having different shapes and vertex counts. Each integrating facet pair may create an artifact in the light pattern after collimation with an outline similar to the geometric shape of the facet. The irregularity of the multitude of facets is then advantageous because each of the facet pairs creates a different artifact, so that for a large number of facets the artifacts wash out and become much less visible.

Figure 6:
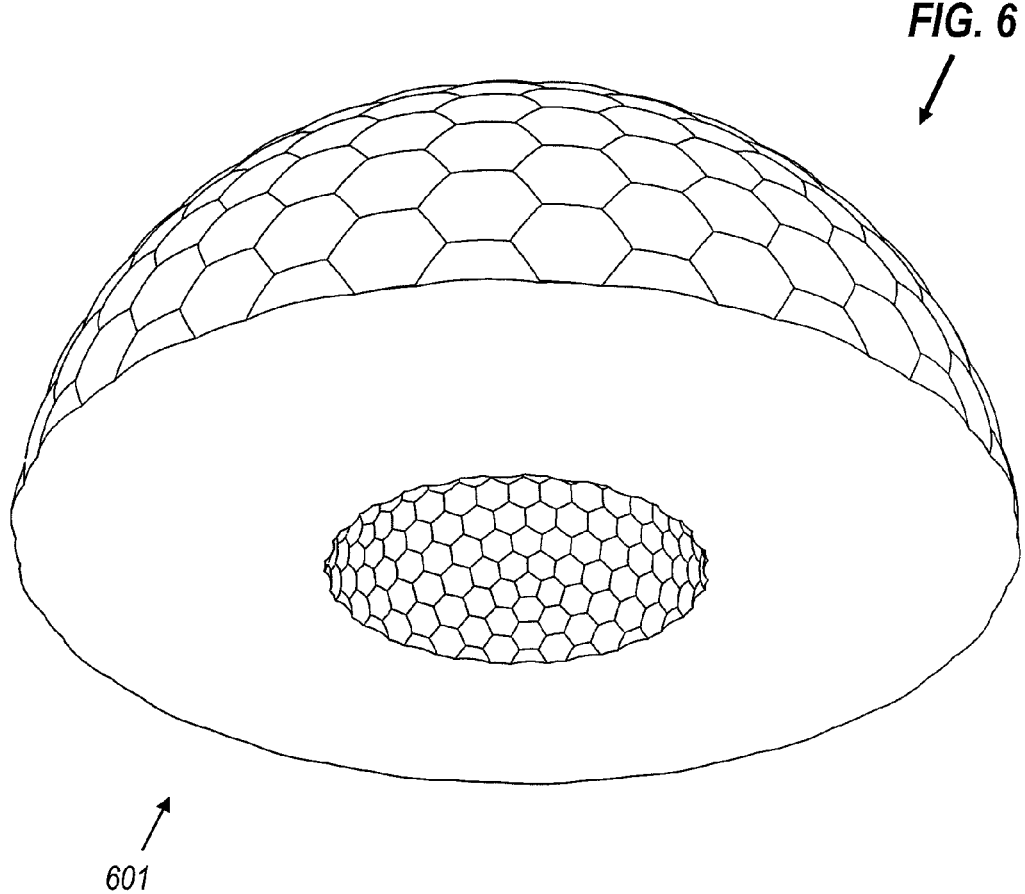
FIG. 6 shows a preferred embodiment of the outer and inner surface of a shell integrator with a higher count of geodesic microlenses.

FIG. 6 shows an example of a geodesic dome 601 with approximately 300 facets on each surface, seen from below so that parts of both the inner and outer hemispheres are shown.

This is a different tessellation known as geodesic dome tessellation, based on truncated icosahedrons. It provides a more regular tessellation of only pentagons and hexagons. Construction methods can be found elsewhere. The hexagons have very similar sizes all over the hemisphere. The pentagons are smaller than the hexagons but they are only 6 pentagons per hemisphere so that for high order geodesic domes the pentagons do not affect the integration quality very much.

In this particular example, the design parameters are inner radius 6 mm, outer radius 8 mm and the integration zone has a diameter of about 2.8 mm. Such a device would work well to integrate over a 2×2 chip array of 1 mm chips and a total diagonal extent of roughly 2.8 mm. However, such a device can be scaled so that a version twice as large has an integrating zone twice as large.

Figure 7:
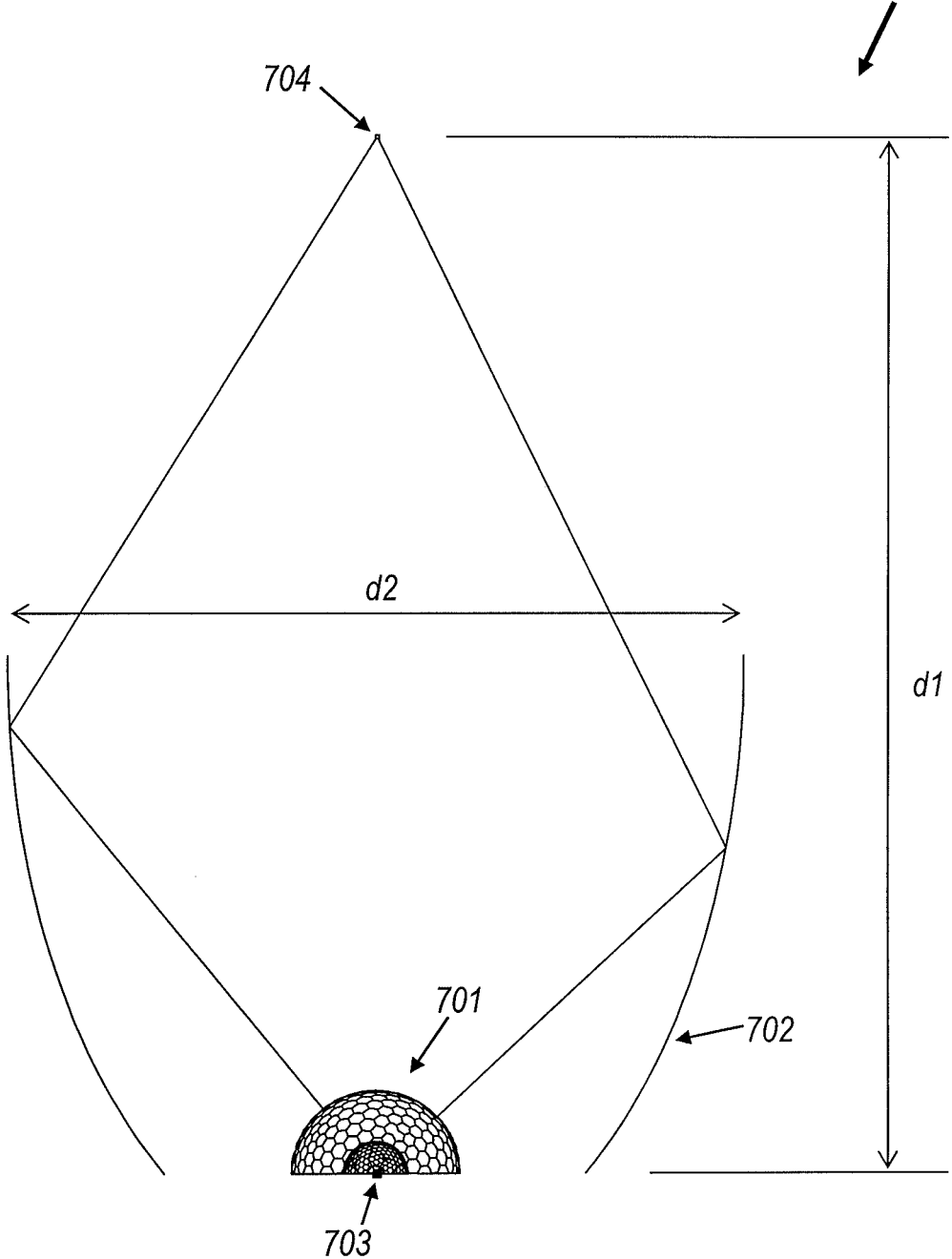
FIG. 7 shows a test setup consisting of an RGB LED source, a shell integrator, an elliptical reflector and a target plane.

FIG. 7 shows a shell integrator 701 like the one in FIG. 6, used with an elliptical reflector 702 of rotational symmetry. A light source 703 is an RGB LED assumed to consist of a 2×2 array of one red, one blue and two green LED chips. Each chip is assumed to be 1×1 mm in size and the 4 chips are closely packed with only a small 0.2 mm wide gap between chips. This simplified source is placed at the first focus 703 of the elliptical mirror and the irradiance pattern at the second focus 704 of this reflector is recorded with and without the shell integrator. This result would be qualitatively the same when using a parabolic mirror to focus the light into the far field. In this example, dimension d1=100 mm and d2=69.8 mm. Dimension D1 is the length from the source at the first focus 703 to the second focus 704. Dimension D2 is the diameter of the open end of the elliptical reflector 702. If the size of the LED source differs from the 2.2 mm square assumed, the other dimensions of the system can be scaled in the usual way.

Figure 8:
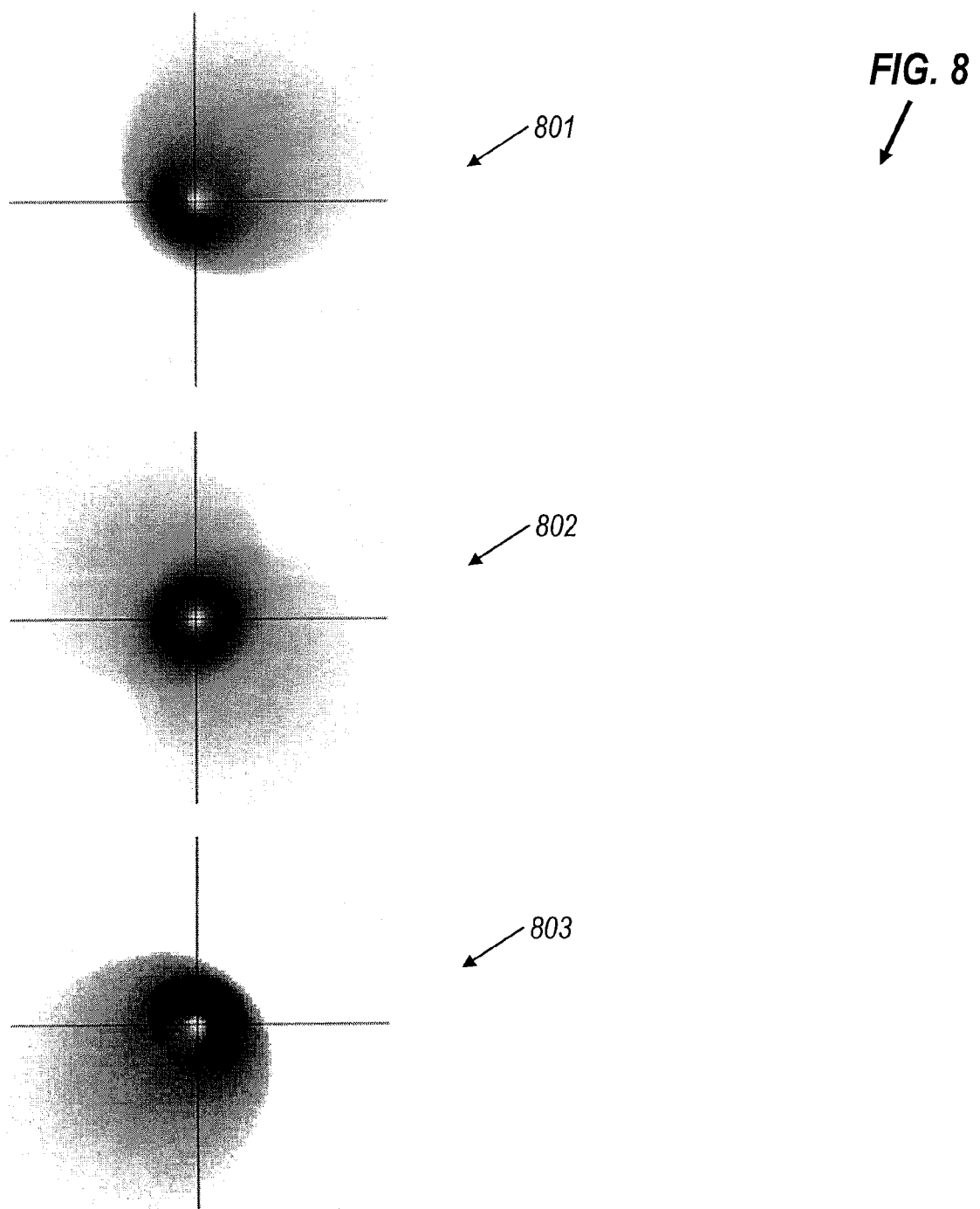
FIG. 8 shows the irradiance patterns of the red, green and blue chips of the test setup of FIG. 7, lit individually without the shell integrator.

FIG. 8 shows the irradiance at the plane of focus 704 of FIG. 7 for the red (801), green (802) and blue (803) outputs when the shell integrator is not present in FIG. 7 and the elliptical reflector is used directly with the RGB LED source. Darker colors represent higher irradiances. These results show that without the shell integrator there are significant differences between the red, green and blue irradiance patterns.

Figure 9:
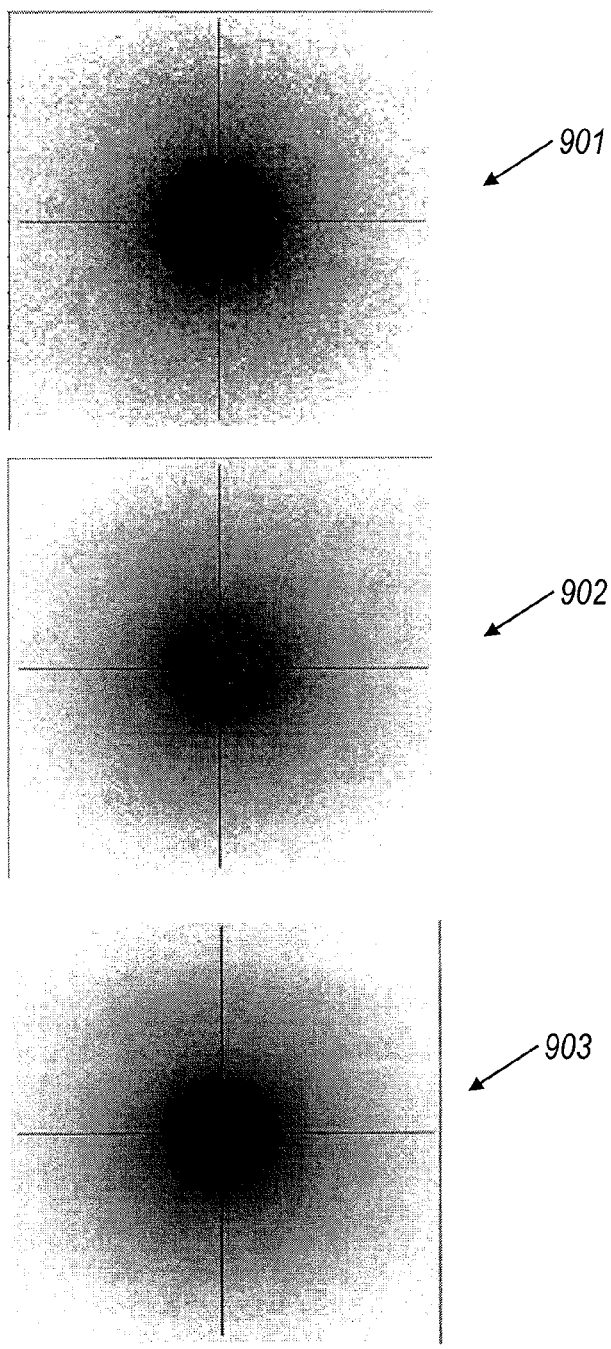
FIG. 9 shows the irradiance patterns of the red, green and blue chips of the test setup of FIG. 7, lit individually with the shell integrator in place.

FIG. 9 shows the irradiance at the plane of focus 704 of FIG. 7 for the red (901), green (902) and blue (903) outputs when the shell integrator is present in FIG. 7 and the elliptical reflector is used the RGB LED source covered by the shell integrator. Darker colors represent higher irradiances. These results show that with the shell integrator the red, green and blue irradiance patterns are similar.

Figure 10:
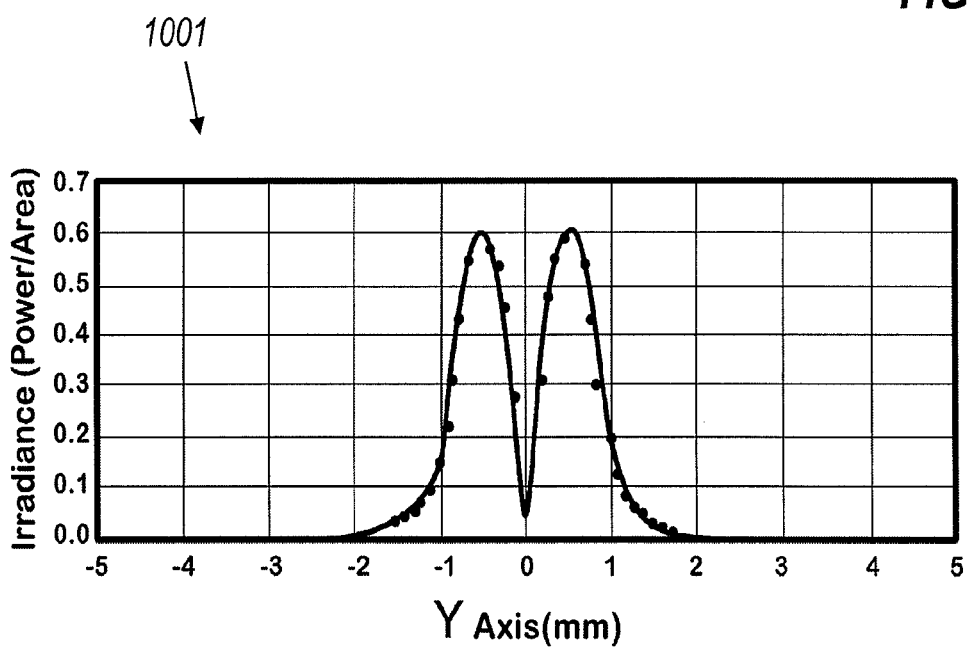
FIG. 10 shows the irradiance distribution of the three channels combined, at the top without and at the bottom with the shell integrator in place.
Figure 10:
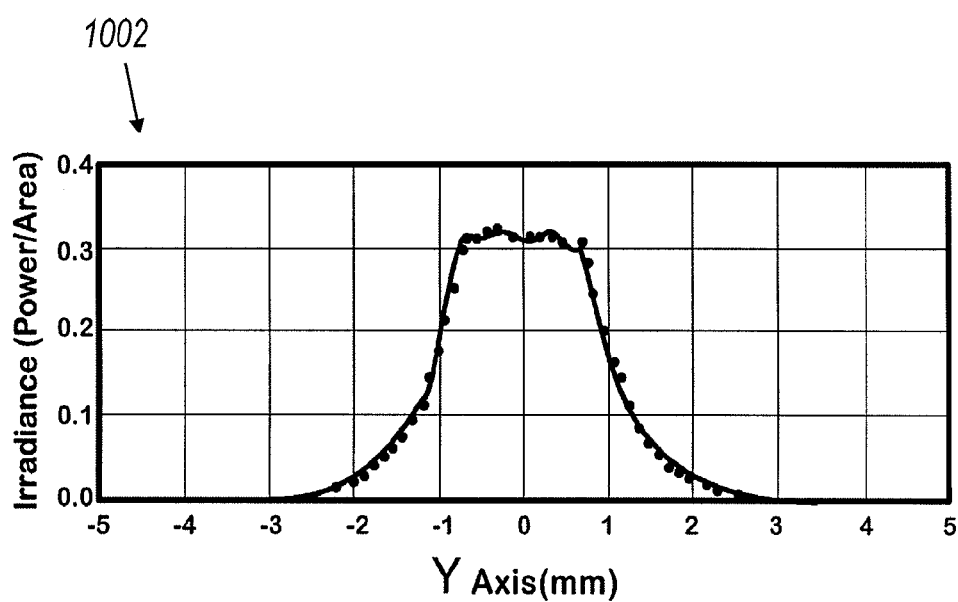

FIG. 10 shows the irradiance at the plane of focus 704 of FIG. 7 for the case without the shell integrator (1001) and with the shell integrator (1002). The graphs in FIG. 10 show irradiance (in relative units of power per unit area) on the vertical axis against distance off axis from Y=−5 mm to Y=+5 mm on the horizontal axis. With the shell integrator the irradiance becomes much more uniform, but the resulting irradiance distribution becomes slightly wider through the use of the shell integrator. The reason for this is a slight étendue dilution of the light source for three reasons. Firstly, the integrating zone is round but the source is square, so that the virtual source has at least the size of a circle including the square of the source. Secondly, the integrating zone is slightly larger in diameter than the real source. This is necessary as the microlenses are not generally round. Thirdly, in this design a spherical integrating zone has been used that includes the planar source disk, so that a hemispherical virtual source is created which, when seen from the side, is substantially larger than a disk seen from the side. However, the total étendue dilution is small and can definitely be kept much smaller than would be created by trying to create a similarly uniform white output in the same setup by employing diffusers.

The invention claimed is:

1. A luminaire comprising a light source and a shell integrator that surrounds said light source, wherein:
   the shell integrator is configured to transform light output from said light source into a virtual image proximate to said light source;
   the shell integrator comprises a dome made of a transparent material with inner and outer refractive surfaces, where there is a space between said inner surface and said light source;
   said inner and outer surfaces are formed as arrays of lenslets convex away from the transparent material of the dome, where each convex lenslet in the array on said inner surface is paired with an associated convex lenslet of said array on said outer surface;
   edges of said array of convex lenslets on both said inner and outer surfaces are formed onto said transparent material as polygonal tessellations forming common edges and vertices between lenslet neighbors, thereby substantially covering said dome without gaps;
   each lenslet of the inner surface is configured so as to image the light source onto a respective associated lenslet of the outer surface;
   each lenslet of the outer surface is configured so as to image the respective associated lenslet of the inner surface as a virtual sub-image having an apparent position at the position of the light source and forming part of said virtual image proximate to the light source; and
   each lenslet of the inner surface is configured so as to image the light source onto substantially the whole of the respective associated lenslet of the outer surface.

2. The luminaire of claim 1, wherein the dome is substantially hemispherical and is centered on the center of the light source.

3. The luminaire of claim 1, wherein the virtual sub-images combine to form a flat apparent integration zone.

4. The luminaire of claim 1, wherein the virtual sub-images combine to form a hemispherical apparent integration zone.

5. The luminaire of claim 1, wherein the light source is enclosed in a transparent encapsulant, and the inner surface of the transparent dome is spaced from the encapsulant.

6. The luminaire of claim 5, wherein the virtual sub-images combine to form an apparent integration zone having a diameter substantially equal to a diameter of the light source multiplied by a refractive index of the encapsulant.

7. The luminaire of claim 1, further comprising a collimator with the light source and shell integrator at an input of the collimator.

8. The luminaire of claim 1, wherein the light source comprises sources of light of different colors and/or has a substantial spatial variation in luminance.

9. The luminaire of claim 1, wherein the lenslets on each of the inner and outer surfaces comprise one dome central lenslet and a plurality of rings of lenslets, wherein the rings are at substantially equal intervals of altitude, and the lenslets in all of the rings are at spacings in the azimuthal direction equal to the altitude spacing of the rings, rounded to give a whole number of evenly spaced lenslets in each ring.

10. The luminaire of claim 1, wherein at least some of the polygonal tessellations have curved edges.

11. The luminaire of claim 1, wherein an inside diameter of the transparent dome is at most 4.25 times a width of the source.

12. The luminaire of claim 1, wherein each lenslet of the inner surface is configured so as to image the light source as a real image at a distance substantially equal to the distance to the outer surface onto substantially the whole area of the respective associated lenslet of the outer surface; and
   each lenslet of the outer surface is configured so as to image the respective lenslet of the inner surface as a virtual image at a distance from the outer surface substantially equal to the distance back to the light source and having an apparent position at the position of the light source.

13. The luminaire of claim 1, wherein each lenslet of the inner surface has a paraxial radius of curvature r1 such that, at least for paraxial rays, $n/(R2-R1)+1/R1 \approx (n-1)/r1$, whereby said lenslet of the inner surface is configured so as to image the light source onto a respective lenslet of the outer surface; and
   each lenslet of the outer surface has a paraxial radius of curvature r2 such that, at least for paraxial rays, $n/(R2-R1)-1/R2 \approx (n-1)/r2$, whereby said lenslet of the outer surface is configured so as to image the respective lenslet of the inner surface as a virtual image having an apparent position at the position of the light source;
   where R1 is the radius of the inner surface from the light source; R2 is the radius of the outer surface from the light source; and n is the refractive index relative to air of a material of the transparent dome between the inner and outer surfaces; and
   wherein $H/R1 \geq n\,W/(R2-R1)$, where H is a width of the light source, and W is a width of the outer lenslet, whereby each said lenslet of the inner surface is configured so as to image the light source onto substantially the whole area of its respective lenslet of the outer surface.

14. A shell integrator comprising
a dome made of a transparent material with inner and outer refractive surfaces, wherein:
   the shell integrator is configured to transform light output from a common source region in the middle of the dome into a virtual image proximate to said common source region, where there is a space between the inner surface and the common source region;
   the inner and outer refractive surfaces are formed as arrays of lenslets convex away from the transparent material of the dome, where each convex lenslet in the array on said inner surface is paired with an associated convex lenslet of said array on said outer surface;
   edges of said array of convex lenslets on both said inner and outer surfaces are formed onto said transparent material as polygonal tessellations forming common edges and vertices between lenslet neighbors, thereby substantially covering said dome without gaps;
   each lenslet of the inner surface is formed so as to image the common source region onto a respective associated lenslet of the outer surface; and
   each lenslet of the outer surface is formed so as to image the respective associated lenslet of the inner surface as a virtual sub-image having an apparent position coinciding with a position of the common source region and forming part of said virtual image proximate to the common source region; and
   each lenslet of the inner surface is configured so as to image the common source region onto substantially the whole of the respective associated lenslet of the outer surface.

15. The shell integrator of claim 14, wherein the dome is substantially hemispherical and is centered on the center of the common source region.

16. The shell integrator of claim 14, wherein the virtual sub-images combine to form a flat apparent integration zone.

17. The shell integrator of claim 14, wherein the virtual sub-images combine to form a hemispherical apparent integration zone.

18. The shell integrator of claim 17, wherein the virtual sub-images combine to form an apparent integration zone having a diameter substantially equal to a diameter of the common source region multiplied by a refractive index of a transparent material usable for an encapsulant.

19. The shell integrator of claim 14, wherein the lenslets on each of the inner and outer surfaces comprise one dome central lenslet and a plurality of rings of lenslets, wherein the rings are at substantially equal intervals of altitude, and the lenslets in all of the rings are at spacings in the azimuthal direction equal to the altitude spacing of the rings, rounded to give a whole number of evenly spaced lenslets in each ring.

* * * * *